United States Patent [19]
Kennedy

[11] Patent Number: 5,740,774
[45] Date of Patent: Apr. 21, 1998

[54] ENGINE INDUCTION AIR SYSTEM HAVING IMPROVED AIR FILTER ACCESSIBILITY

[75] Inventor: Gary Kennedy, Clarkston, Mich.

[73] Assignee: Siemens Electric Limited, Tilbury, Canada

[21] Appl. No.: 768,522

[22] Filed: Dec. 18, 1996

[51] Int. Cl.⁶ .................................................. F02M 35/04
[52] U.S. Cl. .......................... 123/198 E; 55/480; 55/481; 55/385.3; 55/DIG. 28
[58] Field of Search .................. 123/198 E; 55/DIG. 28, 55/DIG. 31, 357, 359, 385.3, 481, 480, 494

[56] References Cited

U.S. PATENT DOCUMENTS

| | | | |
|---|---|---|---|
| 4,617,897 | 10/1986 | Sasaki et al. | 123/432 |
| 4,704,143 | 11/1987 | Percy | 55/481 |
| 4,925,469 | 5/1990 | Clement | 55/480 |
| 5,030,264 | 7/1991 | Klotz et al. | 55/481 |
| 5,085,177 | 2/1992 | Ma | 123/52 |
| 5,125,941 | 6/1992 | Ernst et al. | 55/480 |
| 5,140,957 | 8/1992 | Walker | 123/198 E |
| 5,494,497 | 2/1996 | Lee | 123/198 E |

FOREIGN PATENT DOCUMENTS

| | | | |
|---|---|---|---|
| 2 701 656 | 8/1994 | France | 123/198 E |

Primary Examiner—Erick R. Solis
Attorney, Agent, or Firm—Russel C. Wells

[57] ABSTRACT

In installed position, a filter, comprising a removable particulate filter medium, is disposed in an induction air passage in circumferentially perimetrically sealed relation with the passage side wall. The passage wall has an opening providing for a drawer to be slid into and out of the passage. The drawer has a perimeter that bounds an open center and that supports the filter in covering relation to the open center. Once the drawer has been slid into the passage sufficiently to have passed the filter completely into the passage, the filter abuts the passage wall to prevent further insertion of the filter. Thereupon, continued sliding of the drawer into the passage moves the filter transversely into perimetrically sealed relation with the passage wall, thereby constraining air to pass through the filter medium. The filter is supported in final position by underlying support surfaces on the drawer. The drawer face provides a closure for closing the passage side wall opening upon full insertion of the drawer into the passage. For service, the drawer is slid out of the passage by manually grasping a pull on the exterior of the drawer face. Initial pulling of the drawer out of the passage is converted into bodily movement of the filter out of sealed relation with the passage wall to a position that allows the filter to pass, with the drawer, through the passage side wall opening, rendering it accessible for removal.

19 Claims, 4 Drawing Sheets

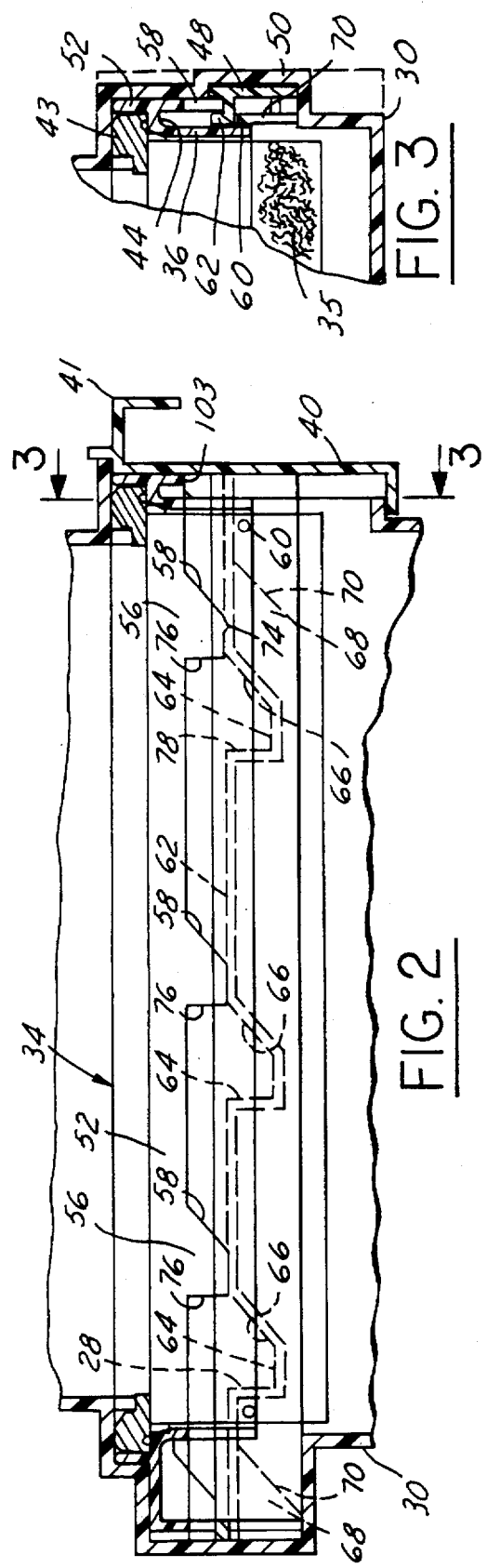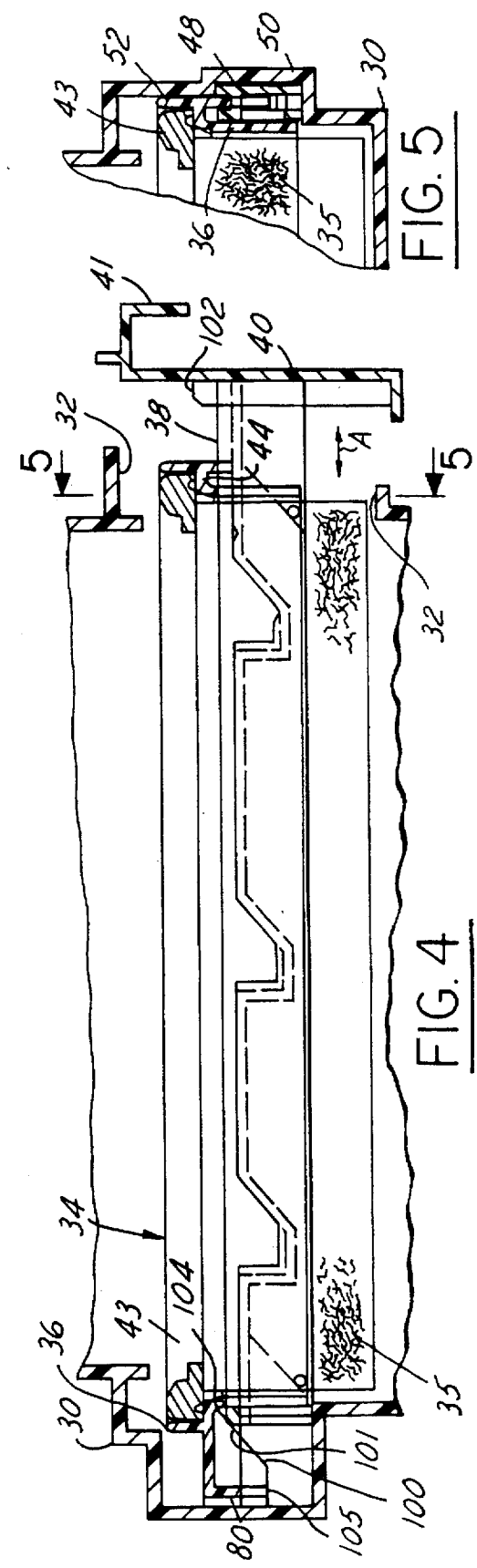

ENGINE INDUCTION AIR SYSTEM HAVING IMPROVED AIR FILTER ACCESSIBILITY

FIELD OF THE INVENTION

This invention relates to internal combustion engine induction air systems that have replaceable particulate filter media for filtering particulate material from induction air. More particularly the invention relates to a mechanism that facilitates installation and removal of the filter medium, especially in compact induction air systems, such that those in the engine compartment of internal combustion engine powered automotive vehicles where space is typically limited.

BACKGROUND AND SUMMARY OF THE INVENTION

A known air filter assembly has two housing halves that close together to capture an air filter element in perimetrically sealed relation to the induction flow path so that induction air is constrained to pass through the filter medium of the air filter element. One housing half must be disassembled from the other in order to access the filter element for servicing. Such an air filter assembly requires a certain amount of space to allow for this servicing. Consequently in an automotive vehicle engine compartment, that type of assembly may impose disadvantageous constraints on the mounting and/or design of other engine compartment components, and/or vice versa.

Another known form of air filter assembly comprises a permanently assembled housing where the filter element is slid into place. For example, see U.S. Pat. No. 4,925,469. The invention of this present patent application relates to a novel mechanism for mounting a filter element in an air induction system that provides important advantages and benefits. More specifically, the invention provides a mechanism that: provides a movement for correctly inserting, positioning, and sealing an air filter element; provides well-controlled application of proper sealing force around the perimeter of the filter medium; releasably locks the mechanism upon attainment of proper positioning and sealing of the filter medium; that, at time of servicing, applies force around the sealed filter medium that readily breaks the seal; and that is capable of single-handed operation.

The advantages of the inventive mechanism are of particular benefit in an integrated air/fuel system (IAFS) where the air induction system comprises a manifold into which multiple components are integrated. Incorporation of the invention into an IAFS provides greater design flexibility for the IAFS and affords opportunities for greater integration and lower cost.

Generally speaking, the invention comprises an induction air passage, bounded circumferentially by a side wall. A filter, comprising a removable particulate filter medium, is disposed in the passage in circumferentially perimetrically sealed relation with the passage side wall to thereby constrain induction air flow to pass through the filter medium. The passage side wall has an opening providing for a drawer to be slid into and out of the induction air passage. The drawer has a perimeter that bounds an open center of the drawer and that supports the filter in covering relation to the drawer's open center. Once the drawer has been slid into the passage sufficiently to have passed the filter completely into the passage, a stop on the filter abuts the passage wall to prevent further insertion of the filter into the passage. Thereupon, continued sliding of the drawer into the passage is converted into bodily movement of the filter in a transverse direction, causing the filter to be bodily moved into perimetrically sealed relation with the side wall, and thereby constrain induction air flow to pass through the filter medium. The filter is supported in final position by underlying support surfaces on the drawer. The drawer face provides a closure for closing the passage side wall opening upon full insertion of the drawer into the passage. For servicing the installed filter, the drawer is slid out of the passage by manually grasping a pull on the exterior of the drawer face. Initial pulling of the drawer out of the passage is converted into bodily movement of the filter out of perimetrically sealed relation with the passage side wall to a position relative to the drawer that allows the filter to pass, with the drawer, through the passage side wall opening. Continued sliding of the drawer out of the passage moves the filter out of the passage where it is accessible for removal. One particular embodiment of the invention contemplates that the filter medium be bounded by an integral frame that contains a portion of the mechanism; another embodiment contemplates that the frame be non-integral with the filter medium so that the frame remains with the drawer and the filter medium is insertable into and removable from the frame.

The foregoing, and other features, along with various advantages and benefits of the invention, will be seen in the ensuing description and claims which are accompanied by drawings. The drawings disclose a preferred embodiment of the invention according to the best mode contemplated at this time for carrying out the invention.

BRIEF DESCRIPTION OF THE DRAWINGS

FIG. 2 is an enlarged cross section view in the direction of arrows 2—2 in FIG. 1 showing a first embodiment of the inventive mechanism and filter in installed position.

FIG. 3 is a cross section view in the direction of arrows 3—3 in FIG. 2.

FIG. 4 is a view in the same direction as FIG. 2 showing an intermediate position during operation from the installed position to a service position.

FIG. 5 is a cross section view in the direction of arrows 5—5 in FIG. 4.

DESCRIPTION OF THE PREFERRED EMBODIMENT

Figure 1:
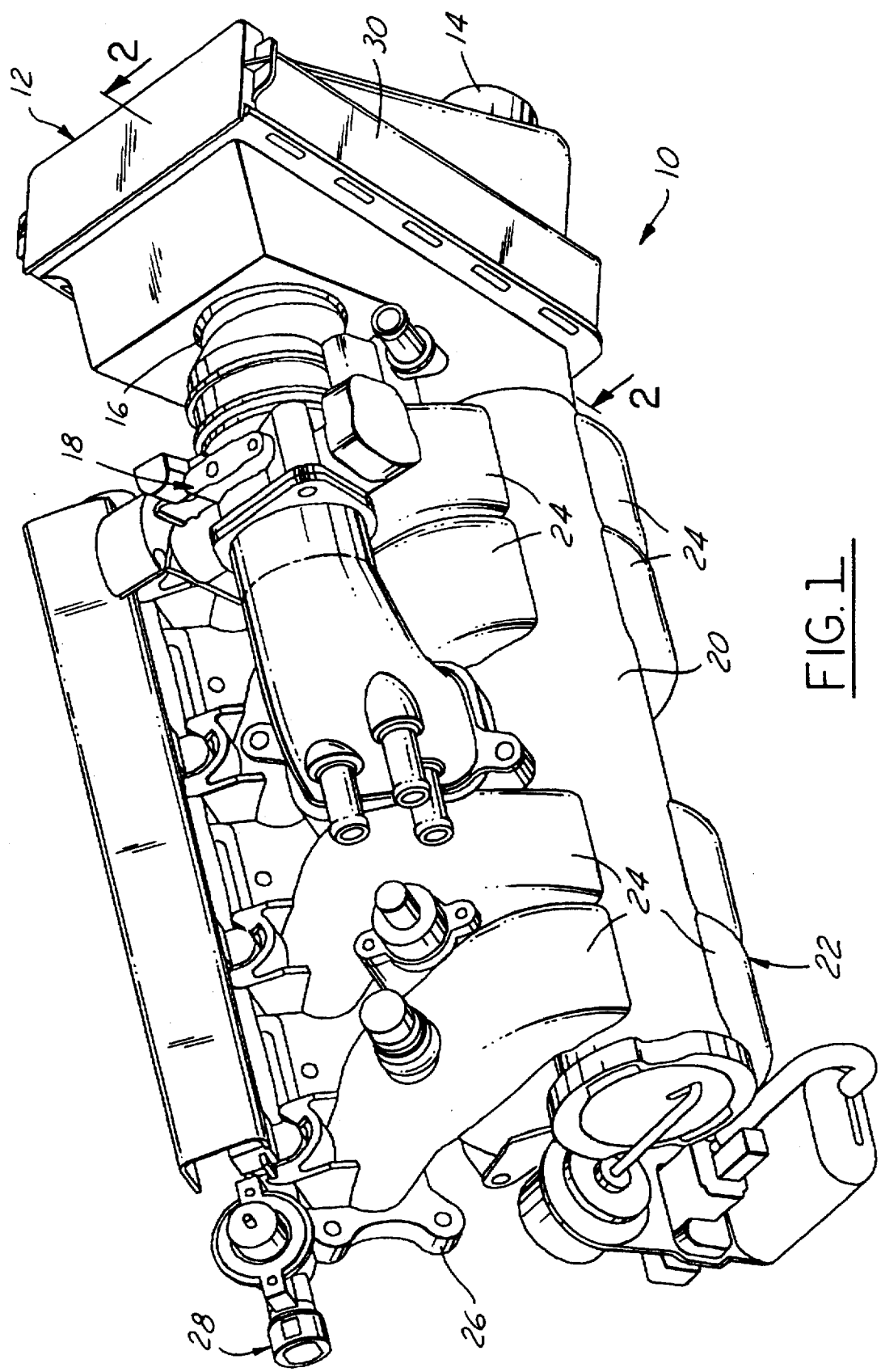
FIG. 1 is a perspective view of an exemplary IAFS that embodies principles of the invention.
Figure 6:
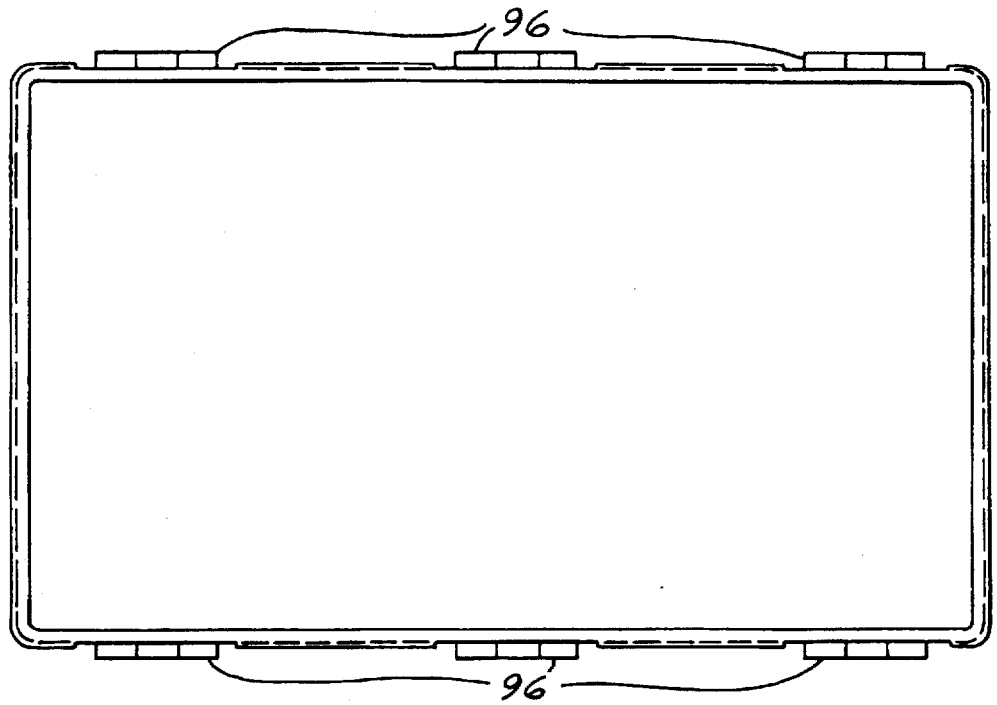
FIG. 6 is a top plan view of a portion of a second embodiment.
Figure 7:
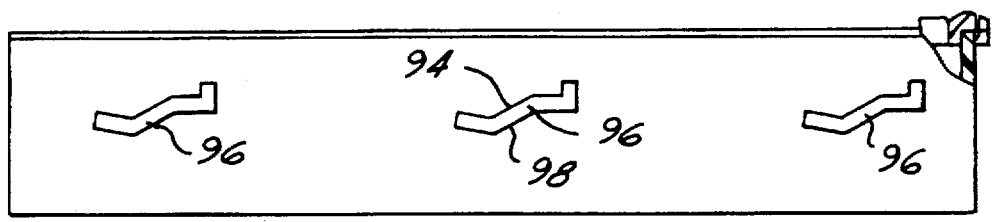
FIG. 7 is a front view of FIG. 6 having a portion broken away for illustrating further detail.

FIG. 1 shows an exemplary IAFS 10 comprising, at one end, an air filtering portion 12 embodying principles of the invention. Air filtering portion 12 has an inlet 14 at which unfiltered air is inducted and an outlet 16 from which filtered air exits to pass to the inlet of a throttle body assembly 18. Throttle body assembly 18 controls the restriction of flow from outlet 16 to a plenum 20 of a manifold 22. Runners 24 extend from plenum 20 to a flange 26 adapted to attach to an engine (not shown) in sealed covering relation to the engine's intake valves to deliver induction air to each engine cylinder when the corresponding intake valve mechanism is open. A fuel rail 28 contains individual, electronicallycontrolled fuel injectors which spray fuel that entrains with the air entering each cylinder to create a combustible air/fuel charge for the cylinder. Air filtering portion 12 comprises a housing 30 having a generally rectangular shape. Depending on the particular engine and vehicle engine compartment, housing 30 may have different shapes and may be associated with the air intake system in different ways. For example, the housing may be entirely, or partially, integrally formed with the manifold; it may be a part that is joined with the manifold; or it may be a separate "stand-alone" unit mounted in a desired location on the engine or in the engine compartment, and connected by a hose, or other air conduit, to a carburetor, throttle body, supercharger, or turbocharger inlet. Inlet 14 is on what is sometimes called the "dirty" air side of housing 30 while outlet 16 is on what is sometimes called the "clean" air side. The combination of inlet 14, housing 30, and outlet 16 circumferentially bound a portion of the length of an induction air passage of the induction air system for the engine, this passage having, in the illustrated example, a circular cross section as it extends through inlet 14 and outlet 16, and a larger rectangular cross section as it extends through the rectangular-shaped housing 30. Other configurations may have other cross sectional shapes, such as elliptical, oval, rectangular, square, etc.

As shown by FIGS. 2–3, in addition to FIG. 1, housing 30 is enclosed, except at inlet 14, outlet 16, and a rectangular opening 32 in a portion of the housing wall bounding the induction air passage. In the installed position portrayed by FIG. 1, an air filter element 34, comprising an air filter medium 35, a filter element support frame 36, and a portion of a drawer 38 are positioned internally of housing 30. Drawer 38 comprises a rectangular face 40 that is shown closing opening 32 in FIG. 1 in a generally sealed manner, but the sealing does not have to be hermetic. FIGS. 2 and 4, but not FIG. 1, show that face 40 comprises an external pull 41, to be manually grasped for sliding the drawer out of the induction air passage through opening 32.

Figure 9:
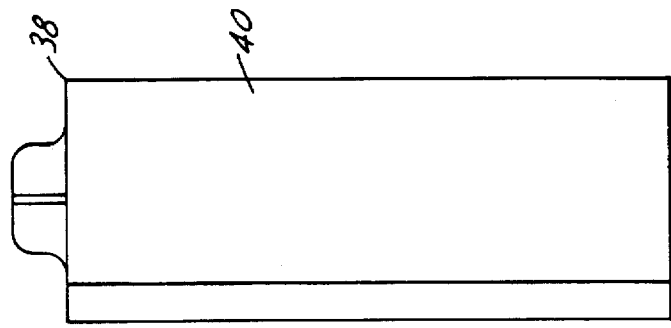
FIGS. 8, 9, and 10 are top plan, right side, and front elevation views respectively of another part of the second embodiment.
Figure 8:
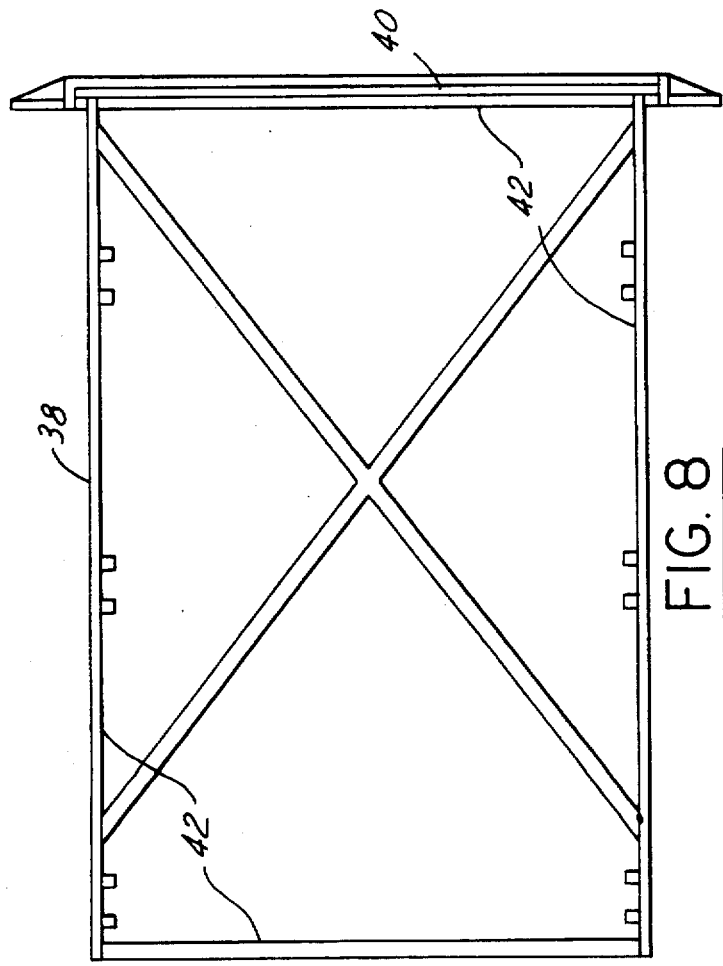
Figure 10:
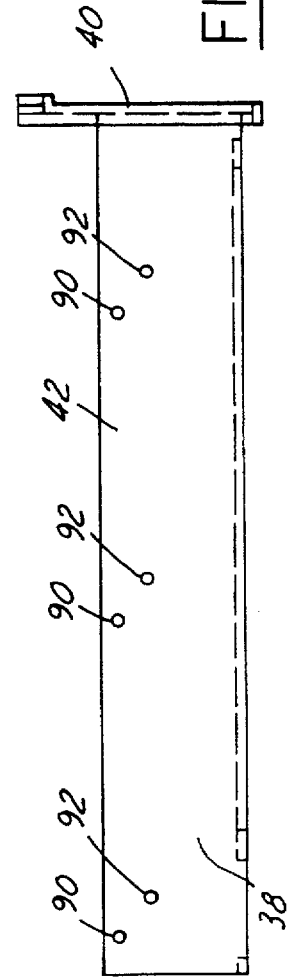

The general appearance of drawer 38 is shown in the second embodiment FIGS. 8–10, although the embodiment of those Figs. differs in certain details from the embodiment of FIGS. 1–5. Drawer 38 comprises a rectangular perimeter 42 that extends perpendicularly from face 40 and that bounds an open center of the drawer. Perimeter 42 supports frame 36, which in turn supports filter element 34, in covering relation to the drawer's open center. Support frame 36 is generally rectangular in shape, bounding an open center that is in registration, or alignment, with the open center of drawer perimeter 42. Filter element 34 is of rectangular shape, and its perimeter is supported by support frame 36 to place the element's filter medium 35 in registration, or alignment, with the open centers of the support frame and the drawer perimeter.

The medium 35 is depicted in FIGS. 2–5 as pleated paper, by way of example, and in this embodiment, unlike in the second one that will be described later, it actually extends completely through the open centers of both frame 36 and drawer perimeter 42. A rectangular perimeter gasket 43 extends around the perimeter of the dirty air side of medium 35. As perhaps best seen in FIG. 3, gasket 43 outwardly overlaps a ledge 44 of frame 36. This ledge extends completely around frame 36. Along the two opposite parallel sides of frame 36 that extend away from face 40, frame 36 includes integrally formed cammed portions of cam mechanisms (to be described).

Housing 30 includes integrally formed guides 48 (FIGS. 3 and 5) for receiving complementary drawer guides 50 of drawer 38 to guide drawer 38 for straight line sliding motion, represented by arrow A in FIG. 4, into and out of the induction air passage via opening 32. FIG. 3 shows the right hand side guides 48 and 50, and it is to be understood that the left hand side guides 48 and 50 would appear as the mirror image of FIG. 3.

The opposite parallel sides of frame 36 which contain cammed portions of the cam mechanisms alluded to above, are each in juxtaposition to a respective side of the drawer perimeter 42. At each of these sides of frame 36, these cam mechanism portions are a sealing cammed portion and an unsealing cammed portion. The sealing cammed portion of the respective frame side comprises a rail 52 that is outboard of, but integrally joins with, ledge 44. Along a lengthwise edge of rail 52 are a series of spaced-apart trapezoidal-shaped formations 56. Each formation 56 comprises an edge surface 58 that is toward drawer face 40. Each edge surface is a flat plane that appears in FIGS. 2 and 4 as a straight line at an acute angle to the direction of drawer sliding into the induction air passage. The unsealing cammed portion of the respective frame side comprises two circular pegs 60 that are located proximate front and rear lower corners of the respective frame side. The pegs extend outboard a short distance from the respective frame side.

The cam mechanisms further comprises camming portions on each of the two parallel sides of the drawer perimeter 42. The camming portion on each side of the drawer perimeter is disposed in juxtaposition to a respective side of frame 36 containing a respective cammed portion. These camming portions are a sealing camming portion and an unsealing camming portion. The sealing camming portion of the respective drawer perimeter side comprises a grooved track 62 that is inboard of, but integrally joins with, the respective drawer perimeter side. The grooved track comprises a series of spaced-apart trapezoidal-shaped depressions 64, each of which is complementary to, but slightly larger than, a corresponding formation 56. Each depression 64 comprises an edge surface 66 that faces away from drawer face 40. Each edge surface 66 is a flat plane that appears in FIGS. 2 and 4 as a straight line at an obtuse angle to a portion of track 62 that runs parallel to the direction of drawer sliding. The unsealing camming portion of the respective drawer perimeter side comprises a two spaced-apart formations 68 that are proximate front and rear of the respective drawer perimeter side. Each formation has an edge surface 70 that is toward drawer face 40. Each edge surface, 70 is a flat plane that appears in FIGS. 2 and 4 as a straight line at an angle to the direction of drawer sliding.

In view of the foregoing description, operation of the mechanism can now be described. With the drawer fully closed, as depicted by FIGS. 2 and 3, filter gasket 43 is being forced into perimetrically sealed relation with the induction air passage side wall, and a detent 74 is effective between each frame rail 52 and the respective drawer perimeter side to retain the two in the closed position. If pull 41 is now grasped and pulled, detents 74 release allowing the drawer to begin to slide out of the induction air passage. As the drawer continues to be pulled, edge surfaces 70 strike respective pegs 60. Since the drawer is constrained for straight-line sliding motion by guides 48, 50, the action of edge surfaces 70 on the curved sides of pegs 60, as the drawer continues to be slid outward, pulls frame 36 into the drawer, breaking the seal of gasket 43 with the side wall of the induction air passage. (It may be desirable to have a mechanical means for releasably affixing the installed filter to the frame to assure that the unsealing action on the frame will be transmitted to the filter element because the unsealing force is applied to the filter element via the frame, not directly to the filter element.) When frame 36 and filter element 34 finally come to rest in drawer 40, formations 56 fit into depressions 64, as shown by FIG. 4. At that time both frame and filter element are in registry with opening 32 so that continued outward sliding of the drawer from the FIG. 4 position, will move the filter element and frame outwardly through opening 32 where the filter element is accessible for service. Such movement occurs because edges 76 of formations 56 abut edges 78 of depressions 64, and these edges 76, 78 are mutually parallel and perpendicular to sliding of the drawer in the outward direction.

At the time of an initial filter installation, or at later time of filter service, pushing of the drawer inward will move the frame and filter through opening 32 and into the induction passage to the FIG. 4 position. During sliding to the FIG. 4 position, frame 36 remains seated in the drawer due to the action of edge surfaces 70 on pegs 60. Upon reaching the FIG. 4 position, one or more abutment stops 80 on the inner end of frame 36 abut the induction passage wall. Continued inward sliding of the drawer now causes the sealing camming portions on the drawer to act on the sealing cammed portions on the frame. Specifically, respective edge surfaces 66 and 101 on the drawer act against respective edge surfaces 58 and 100 on the frame, pushing the frame and filter element transversely out of the drawer to bring the filter element to the final position of FIG. 3. The inside of drawer face 40 contains a formation that provides a support surface 102 for underlying support for a respective surface 103 of the filter frame while an opposite surface 105 of the filter frame is supported by a support surface 104 on the drawer. In this final installed and closed position, drawer face 40 closes opening 32 in a generally sealed manner and detents 74 are engaged.

FIGS. 6-10 show another embodiment of drawer and frame. In this embodiment the sealing camming portions are pegs 90 projecting inwardly of the respective drawer perimeter sides; the unsealing camming portions are pegs 92 projecting inwardly of the respective drawer perimeter sides; the sealing cammed portions are edge surfaces 94 of ramps 96 projecting outwardly of the respective frame sides; and the unsealing cammed portions are edge surfaces 98 of ramps 96. The actions of these cam mechanisms function in like manner to the cam mechanisms of the first embodiment.

While a presently preferred embodiment of the invention has been illustrated and described, it should be appreciated that principles of the invention may be embodied in other constructions that fall within the scope of the following claims.

What is claimed is:

1. An internal combustion engine induction air system comprising an induction air passage, bounded circumferentially by a side wall, and a filter, comprising a removable particulate filter medium, disposed in the induction air passage in circumferentially perimetrically sealed relation with the passage side wall to thereby constrain induction air flow to pass through the filter medium, the system comprising:

an opening in the passage side wall providing for a drawer to be slid into and out of the induction air passage; a drawer that slides through the passage opening in opposite directions into and out of the passage; the drawer comprising a perimeter that bounds an open center of the drawer and that supports the filter in covering relation to the drawer's open center; a filter stop that, once the drawer has been slid into the passage sufficiently to have passed the filter through the passage side wall opening completely into the passage, abuts the filter to prevent further insertion of the filter into the passage in the direction of drawer sliding into the passage; a mechanism that is effective once the filter abuts the filter stop to convert continued sliding of the drawer into the passage into bodily movement of the filter in a direction transverse to the direction of drawer sliding, causing the filter to be bodily moved into perimetrically sealed relation with the side wall, and thereby constrain induction air flow to pass through the filter medium; and a closure for closing the passage side wall opening after the filter has been bodily moved into perimetrically sealed relation with the passage side wall.

2. An induction air system as set forth in claim 1 wherein, with the filter in perimetrically sealed relation with the side wall, the mechanism is further effective to convert sliding of the drawer in the direction out of the passage into bodily movement of the filter in a direction transverse to the direction of drawer sliding, causing the filter to be bodily moved out of perimetrically sealed relation with the passage side wall and return to a position relative to the drawer that allows the filter to pass, with the drawer, through the passage side wall opening upon continued sliding of the drawer out of the passage.

3. An induction air system as set forth in claim 2 wherein the closure is part of the drawer, and includes a manual pull for sliding the drawer by hand.

4. An induction air system as set forth in claim 2 wherein the mechanism comprises plural cam mechanisms for bodily moving the filter into and out of perimetrically sealed relation with the passage side wall.

5. An induction air system as set forth in claim 4 wherein the drawer perimeter comprises parallel sides that extend in the same direction as the direction of drawer sliding, the filter comprises parallel sides which extend in the same direction as the direction of drawer sliding, and each of which is in juxtaposition to a respective side of the drawer, a sealing camming portion of one cam mechanism is disposed on one of the sides of the drawer, a sealing cammed portion of the one cam mechanism is disposed on the juxtaposed side of the filter, a sealing camming portion of another cam mechanism is disposed on the other of the sides of the drawer, a sealing cammed portion of the another cam mechanism is disposed on the juxtaposed side of the filter, the sealing camming portions being effective to act on the sealing cammed portions to bodily move the filter into perimetrically sealed relation with the passage side wall, an unsealing camming portion of the one cam mechanism is disposed on the one of the sides of the drawer, an unsealing cammed portion of the one cam mechanism is disposed on the juxtaposed side of the filter, an unsealing camming portion of the another cam mechanism is disposed on the other of the sides of the drawer, and an unsealing cammed portion of the another cam mechanism is disposed on the juxtaposed side of the filter, the unsealing camming portions being effective to act on the unsealing cammed portions to bodily move the filter out of perimetrically sealed relation with the passage side wall.

6. An induction air system as set forth in claim 1 wherein each of the sealing camming portions comprises plural sealing camming surfaces spaced along the respective side of the drawer, each of the sealing cammed portions comprises plural sealing cammed surfaces spaced along the respective side of the filter, each of the unsealing camming portions comprises plural unsealing camming surfaces spaced along the respective side of the drawer, and each of the unsealing cammed portions comprises plural unsealing cammed surfaces spaced along the respective side of the filter.

7. An induction air system as set forth in claim 6 wherein the unsealing cammed surfaces are curved, and the unsealing camming surfaces are straight.

8. An induction air system as set forth in claim 6 wherein the sealing cammed surfaces are straight, and the sealing camming surfaces are straight.

9. An induction air system as set forth in claim 5 including detents that, once the filter has been bodily moved into perimetrically sealed relation with the passage side wall, are effective between the drawer and the filter to define a final inward position of the drawer.

10. An induction air system as set forth in claim 1 including guides for guiding the drawer for sliding motion along a straight path.

11. An induction air system as set forth in claim 1 wherein the filter comprises a perimeter frame that bounds an open center of the perimeter frame and that supports the filter medium in removably covering relation to the perimeter frame's open center.

12. An internal combustion engine induction air system comprising an induction air passage, bounded circumferentially by a side wall, and a filter, comprising a removable particulate filter medium, disposed in the induction air passage in circumferentially perimetrically sealed relation with the passage side wall to thereby constrain induction air flow to pass through the filter medium, the system comprising:

an opening in the passage side wall providing for a drawer to be slid into and out of the induction air passage; a drawer that slides through the passage opening in opposite directions into and out of the passage; the drawer comprising a perimeter that bounds an open center of the drawer and that supports the filter in covering relation to the drawer's open center;

a filter stop that, once the drawer has been slid into the passage sufficiently to have passed the filter through the passage side wall opening completely into the passage, abuts the filter to prevent further insertion of the filter into the passage in the direction of drawer sliding into the passage;

cam mechanisms that, once the filter abuts the filter stop, are effective to convert continued sliding of the drawer into the passage into bodily movement of the filter in a direction transverse to the direction of drawer sliding, causing the filter to be bodily moved into perimetrically sealed relation with the side wall, and thereby constrain induction air flow to pass through the filter medium, and that, with the filter in perimetrically sealed relation with the side wall, are effective to convert sliding of the drawer out of the passage into bodily movement of the filter in a direction transverse to the direction of drawer sliding, causing the filter to be bodily moved out of perimetrically sealed relation with the side wall and return to a position relative to the drawer that allows the filter to pass, with the drawer, through the passage side wall opening upon continued sliding of the drawer out of the passage.

13. An induction air system as set forth in claim 12 further including a closure for closing the passage side wall opening after the filter has been bodily moved into perimetrically sealed relation with the passage side wall.

14. An induction air system as set forth in claim 13 wherein the drawer perimeter comprises parallel sides that extend in the same direction as the direction of drawer sliding, the filter comprises parallel sides which extend in the same direction as the direction of drawer sliding, and each of which is in juxtaposition to a respective side of the drawer, and wherein a sealing camming portion of one cam mechanism is disposed on one of the sides of the drawer, a sealing cammed portion of the one cam mechanism is disposed on the juxtaposed side of the filter, a sealing camming portion of another cam mechanism is disposed on the other of the sides of the drawer, a sealing cammed portion of the another cam mechanism is disposed on the juxtaposed side of the filter, the sealing camming portions being effective to act on the sealing cammed portions to bodily move the filter into perimetrically sealed relation with the passage side wall, an unsealing camming portion of the one cam mechanism is disposed on the one of the sides of the drawer, an unsealing cammed portion of the one cam mechanism is disposed on the juxtaposed side of the filter, an unsealing camming portion of the another cam mechanism is disposed on the other of the sides of the drawer, and an unsealing cammed portion of the another cam mechanism is disposed on the juxtaposed side of the filter, the unsealing camming portions being effective to act on the unsealing cammed portions to bodily move the filter out of perimetrically sealed relation with the passage side wall.

15. An induction air system as set forth in claim 14 wherein each of the sealing camming portions comprises plural sealing camming surfaces spaced along the respective side of the drawer, each of the sealing cammed portions comprises plural sealing cammed surfaces spaced along the respective side of the filter, each of the unsealing camming portions comprises plural unsealing camming surfaces spaced along the respective side of the drawer, and each of the unsealing cammed portions comprises plural unsealing cammed surfaces spaced along the respective side of the filter, and including detents that, once the filter has been bodily moved into perimetrically sealed relation with the passage side wall, are effective between the drawer and the filter to define a final inward position of the drawer.

16. An internal combustion engine induction air system comprising an induction air passage, bounded circumferentially by a side wall, and an open-center frame adapted to support a replaceable filter medium in the induction air passage in circumferentially perimetrically sealed relation with the passage side wall so as to constrain induction air flow to pass through the filter medium, the system comprising:

an opening in the passage side wall providing for a drawer to be slid into and out of the induction air passage; a drawer that slides through the passage opening in opposite directions into and out of the passage; the drawer comprising a perimeter that bounds an open center of the drawer and that supports the open-center frame in registration with the drawer's open center;

a stop that, once the drawer has been slid into the passage sufficiently to have passed the frame through the passage side wall opening completely into the passage, abuts the frame to prevent further insertion of the frame into the passage in the direction of drawer sliding into the passage; a mechanism that is effective once the frame abuts the stop to convert continued sliding of the drawer into the passage into bodily movement of the frame in a direction transverse to the direction of drawer sliding, causing the frame to be bodily moved to a final position adapted to cause a replaceable filter medium covering the open-center of the frame into perimetrically sealed relation with the side wall, and thereby constrain induction air flow to pass through the replaceable filter medium.

17. An induction air system as set forth in claim 16 further including a replaceable filter medium covering the open-center of the frame.

18. An induction air system as set forth in claim 17 further including a closure for closing the passage side wall opening after the frame has been bodily moved to move the replaceable filter medium into perimetrically sealed relation with the passage side wall.

19. An induction air system as set forth in claim 16 wherein, with the frame in the final position, the mechanism is further effective to convert sliding of the drawer in the direction out of the passage into bodily movement of the frame in a direction transverse to the direction of drawer sliding, causing the frame to be bodily returned to a position relative to the drawer that allows the frame to pass, with the drawer, through the passage side wall opening upon continued sliding of the drawer out of the passage.

* * * * *